Sept. 6, 1960    R. S. SENNETT    2,951,321
METHOD OF SEALING GAS-TIGHT ENCLOSURES
Filed March 8, 1957
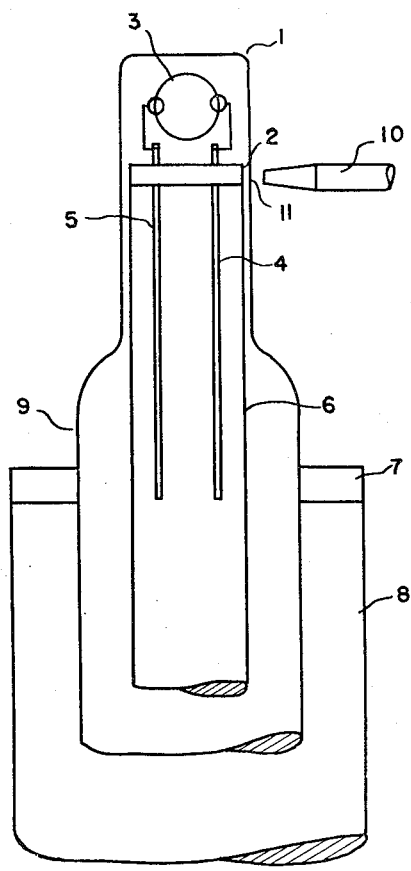
INVENTOR.
ROY SIDNEY SENNETT
BY
*Frank R. Trifari*
AGENT

United States Patent Office 2,951,321
Patented Sept. 6, 1960

2,951,321

METHOD OF SEALING GAS-TIGHT ENCLOSURES

Roy Sidney Sennett, Toronto, Ontario, Canada, assignor to North American Philips Co., Inc., New York, N.Y.

Filed Mar. 8, 1957, Ser. No. 644,802

4 Claims. (Cl. 53—22)

My invention relates to a method of sealing together fusible materials and more particularly to the sealing of gas-tight enclosures for miniaturized electronic components an example of which is the method of sealing a quartz crystal frequency controlling unit in an evacuated holder of very small dimensions.

In the manufacture of miniature gas-tight enclosures of the gas-filled or evacuated type, several different methods of sealing are presently employed. In the type of seal with which this application is concerned, a glass cap or bulb is sealed to a glass header or base, supporting an electronic component such as a quartz crystal, by heating the adjoining surfaces so that fusing takes place and a gas-tight seal is made.

In the sealing of enclosures of very small dimensions such as those employed for semi-conductors or piezo-electric crystals, it is very essential that a minimum of the heat used for sealing reaches the components being enclosed as the abovementioned two electronic components, at least, are subject to damage by temperatures in excess of their normal operating temperatures.

It is known to enclose electronic components such as quartz crystals in evacuated glass enclosures but it has been found necessary to mount the component on relatively long leads so that it is supported at a considerable distance from the vicinity of the seal in order that heat damage be substantially eliminated during the sealing operation. This method does not lend to obtaining the maximum in miniaturization.

In order to overcome the defects of the above-described sealing techniques, I have developed a method of sealing a miniaturized container by the gas flame technique wherein heat flow to the enclosed component is substantially eliminated.

The parts of the enclosure employed in carrying out the method of my invention comprise a substantially flat glass base member of circular or other suitable configuration and a glass tubulation, closed at one end and of internal diameter such that it fits snugly about the base member.

In effecting the seal the base member is supported on a suitable support rod centered in a vacuum chuck and the open end of the tubulation is slipped over the base member and into contact with the chuck gasket to provide a gas-tight connection. The support rod is of a length such that the base member is supported within the tubulation in the position desired for the completed unit. The tubulation is then evacuated, and baked out if desired, heat is supplied to the tubulation at the junction line between the base and the tubulation by means of a fine gas flame which is rotated with respect to the tubulation to cause collapse under external air pressure and fusion of the tubulation onto the peripheral edge of the base. The speed of rotation is such that the fusion of the tubulation to the base takes place only beneath the point of contact of the flame. That is to say that the speed of relative rotation between the flame and the tubulation is such that only the tubulation directly in contact with the flame is sufficiently heated to cause collapse and fusion to the base member. It should be understood that the seal may be completed during one complete revolution of the flame with respect to the tubulation or the flame and speed of the rotation may be adjusted so that a few revolutions, for example three, are required to bring the unit up to the temperature whereas fusion will take place in synchronism with the rotation. This is contrary to common sealing practice wherein the speed of relative rotation is such as to cause the whole sealing area to be in a fused condition at one time.

This method of sealing substantially reduces the amount of heat flow to a component in the enclosure whereas in contradistinction it has been impossible heretofore to complete a satisfactory unit wherein the entire seal area is heated to the sealing temperature at the same time.

My invention will now be described with reference to the figure of the drawing which shows a preferred embodiment thereof.

In the drawing, only the portion of the sealing machine necessary for the understanding of the invention is shown.

The machine comprises a support rod or positioning jig 6, of cylindrical or other suitable shape. A glass header or base 2 of an enclosure unit is supported on rod 6. An electronic component, such as a quartz crystal 3, is mounted on lead pins 4, 5 which pass through the base or header 2 to facilitate external connection to the crystal unit. Support rod 6 may be hollow or preferably have appropriate holes drilled therein to receive the extensions of leads 4 and 5. Support rod 6 is located centrally of a vacuum chuck 8 which may be of standard design having a rubber gasket 7. Chuck 8 is connected to a suitable vacuum system.

A glass bulb 1 overlaps the peripheral edge of the base 2 and the enlarged portion 9 fits snugly into gasket 7 to provide a gas-tight joint. Bulb 1 is contoured to fit closely about the base member 2 when the bulb and base are in the appropriate positions desired in the sealed unit. Bulb 1 may be tapered to facilitate the fit. In the unit shown the bulb 1 has been flattened at right angles to the plane of the drawing to provide the proper fit for an oblong-shaped base 2.

When a suitable vacuum is achieved, a fine gas flame is supplied by burner 10 to the junction 11 of the bulb with the peripheral edge of base 2. The burner 10 is rotated relative to bulb 1 and base 2 at such a rate as to just provide for collapse and fusion under external air pressure of bulb 1 onto base 2 in synchronism with the relative rotation. One or more revolutions may be required to bring the unit up to a temperature whereat this action takes place. In this manner a minimum of heat is conducted to the crystal element 3. A cam may be provided on the machine when non-cylindrical seals are effected to ensure that the flame is maintained a constant distance from the bulb 1. Bake out for the crystal unit enclosure may be advantageously employed prior to the sealing operation.

Precaution must be taken to ensure that a very fine flame is employed so that the heat is confined to the desired sealing area. By providing that the bulb just collapses and fuses to base 2 at the point of contact of the flame and in synchronism with the relative movement, it is further ensured that the heat necessary for sealing is maintained at a minimum and that the shape of the bulb is substantially maintained thus negating the necessity of support for the upper end of the bulb during the sealing operation.

The difference in external and internal pressures on the bulb 1 causes it to collapse and seal at a lower temperature than would be the case if no pressure difference existed.

After the seal is completed, the completed enclosure is removed from the machine and the overhang of the bulb 1 is removed.

It will be obvious to those skilled in the art that many modifications may be made without departing from the spirits and scopes of this invention. For instance the burner may be stationary and the vacuum chuck and enclosure unit rotated or vice versa. An inert gas may be allowed into the bulb after evacuation and prior to sealing, cognizance being taken of the fact that a pressure differential with respect to the inside and outside of the bulb is desirable.

Various shapes and sizes of bulbs and headers may be employed with varying numbers of leads. It is obvious that electronic components other than quartz crystals may be enclosed as for example transistors or semi-conductor diodes.

It is further possible that more than one sealing flame or burner could be employed but the heat conducted to the enclosed component will increase with the number of burners.

Substances other than glass, for instance plastics which fuse at relatively low temperatures, may be used in the cap and base members.

The embodiments of the invention in which an exclusive property or privilege is claimed are defined as follows:

1. The method of sealing a fusible enclosure constituted by a base element and a tubulation having one end thereof closed comprising, supporting said base in position inside said tubulation, drawing a vacuum on said tubulation, applying a single flame externally to a narrow band of said tubulation at the junction of said base and tubulation and rotating the flame and the enclosure unit with respect to one another at such a rate as to just cause the tubulation material to fuse and collapse along the entire circumference of said base only at the point of flame contact and in synchronism with the said relative rotation.

2. The method of sealing a fusible enclosure for a miniaturized electronic component while preventing heat damage to said component comprising, supporting the base member of the enclosure in position inside a tubulation having one of its ends closed, drawing a vacuum on said closed tubulation, directing a single fine flame onto a narrow band of said tubulation at the junction of the base therewith and rotating the enclosure member with respect to said flame at such a rate as to just allow for collapse and fusion of the tubulation material to said base only at the point of flame impact and at the entire circumference of said enclosure and in synchronism with said rotation.

3. The method of sealing as claimed in claim 1 wherein after drawing a vacuum on the enclosure further supplying an inert gas therein, the pressure of said gas being less than the external pressure.

4. The method of manufacturing an evacuated fusible enclosure constituted by a cap fused to a base comprising, supporting said base in position inside a glass tubulation one end of which is closed, drawing a vacuum on said tubulation, directing a single fine flame externally at the junction of said base and the tubulation at a narrow peripheral band thereof, and rotating said tubulation and base with respect to said flame at such a rate that the tubulation is heated to fusion and collapses, under external air pressure, onto said base only at the point of flame contact, wherein said relative speed of rotation between the tubulation and flame and the temperature of the flame is such as to just provide for collapse of said tubulation in synchronism with the rotation.

References Cited in the file of this patent

UNITED STATES PATENTS

| | | |
|---|---|---|
| 1,911,410 | Valverde | May 30, 1933 |
| 1,965,232 | Gustin | July 3, 1934 |
| 2,223,031 | Edwards | Nov. 26, 1940 |
| 2,379,342 | Cozzoli | June 26, 1945 |
| 2,494,915 | Van Der Poel | Jan. 17, 1950 |
| 2,643,020 | Dalton | June 23, 1953 |
| 2,795,905 | Berge | June 18, 1957 |

UNITED STATES PATENT OFFICE
CERTIFICATION OF CORRECTION

Patent No. 2,951,321            September 6, 1960

Roy Sidney Sennett

It is hereby certified that error appears in the above numbered patent requiring correction and that the said Letters Patent should read as corrected below.

In the heading to the printed specification, between lines 5 and 6, insert the following:

Claims priority, application Canada November 10, 1956

Signed and sealed this 2nd day of May 1961.

(SEAL)
Attest:

ERNEST W. SWIDER
Attesting Officer

DAVID L. LADD
Commissioner of Patents